United States Patent [19]
Teich et al.

[11] 4,156,806
[45] May 29, 1979

[54] CONCENTRATED ENERGY MICROWAVE APPLIANCE

[75] Inventors: Wesley W. Teich, Wayland; Robert F. Bowen, Burlington; George Freedman, Wayland; Thomas J. Martel, North Reading; Kenneth W. Dudley, Sudbury, all of Mass.

[73] Assignee: Raytheon Company, Lexington, Mass.

[21] Appl. No.: 866,081

[22] Filed: Dec. 30, 1977

[51] Int. Cl.² ............................................. H05B 9/06
[52] U.S. Cl. ............................ 219/10.55 E; 99/323.5; 426/107; 426/243; 426/449
[58] Field of Search ............... 219/10.55 E, 10.55 R, 219/10.55 F, 432; 99/323.4, 323.5, 323.8, 345, 347; 426/107, 113, 241, 243, 449

[56] References Cited
U.S. PATENT DOCUMENTS

| | | | |
|---|---|---|---|
| 2,602,134 | 7/1952 | Nelson | 219/10.55 A |
| 2,939,379 | 6/1960 | Schmitt | 219/10.55 R X |
| 3,835,280 | 9/1974 | Gades et al. | 219/10.55 F X |
| 3,974,354 | 8/1976 | Long | 219/10.55 E |

Primary Examiner—Arthur T. Grimley
Attorney, Agent, or Firm—Harold A. Murphy; Joseph D. Pannone; John T. Meaney

[57] ABSTRACT

An appliance for heating seeds, nuts, grains and the like such as popcorn kernels, for example, by means of microwave radiation, comprising a bowl which is transparent to microwave energy and which has in its lower region an area of restricted size for holding unheated kernels in a clump, the area of the bowl above the restricted area being larger to allow heated kernels to expand, and means for concentrating the microwave energy upon the clump of kernels.

18 Claims, 5 Drawing Figures

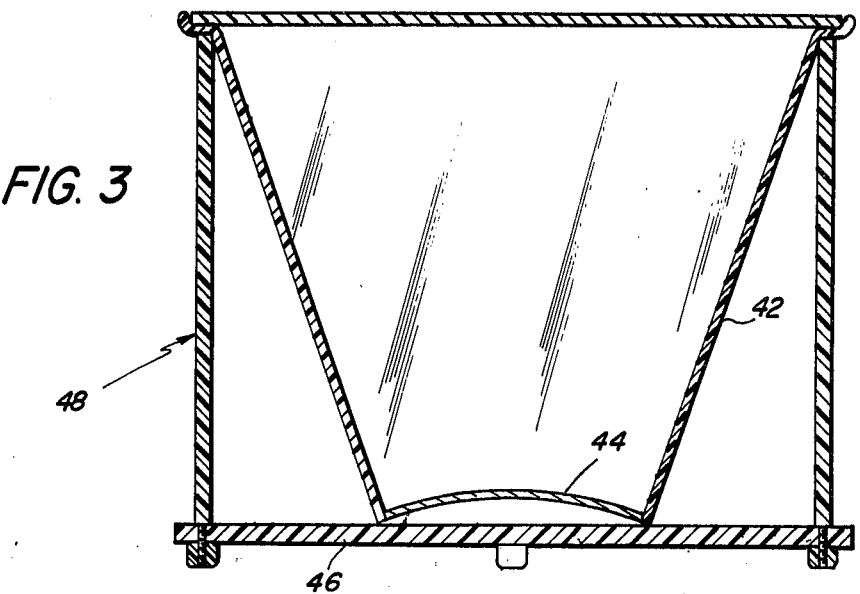
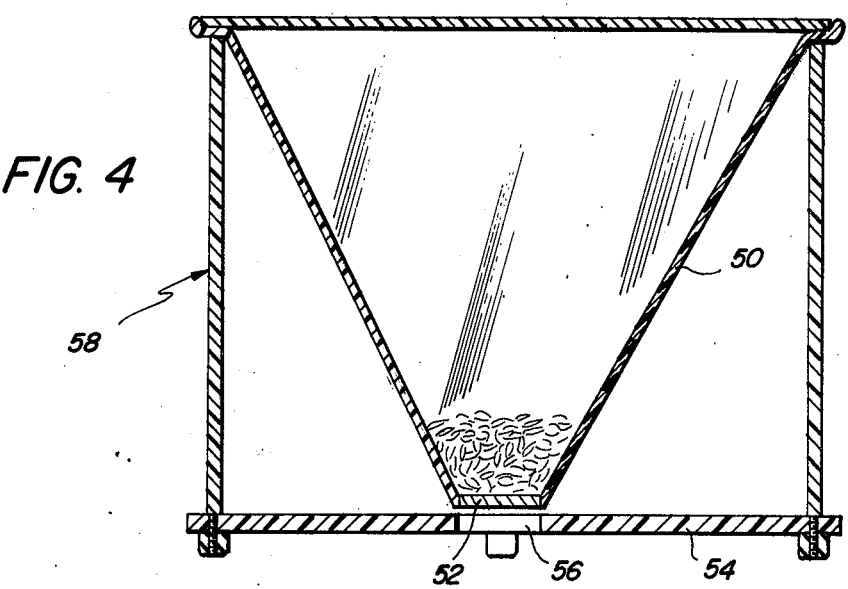
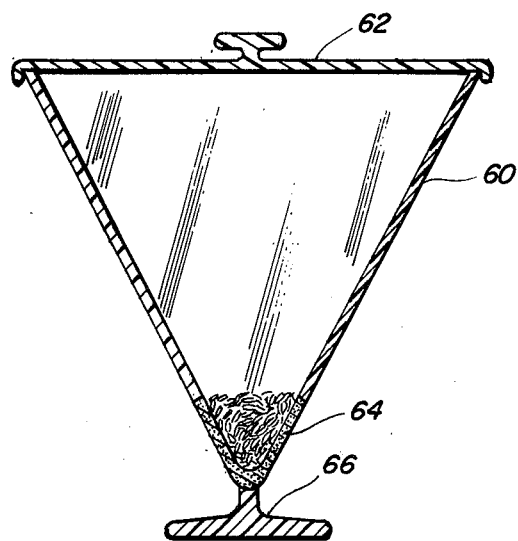

CONCENTRATED ENERGY MICROWAVE APPLIANCE

BACKGROUND OF THE INVENTION

This invention relates to the heating of various grains, nuts or seeds by microwave energy and has particular reference to appliances for making popcorn of the like within a microwave oven.

It is commonly known that heat may be applied to grains, nuts seeds or kernels for various purposes. Edible nuts may be roasted, rice grains may be puffed and popcorn kernels may be popped by application of heat either radiatively or convectively in well known conventional ovens fueled by electrical energy, by the burning of liquid or gaseous fuel or by combustion of solid fuel.

Popcorn has been made in many ways. Kernels have been placed in a screenlike container with a long handle so that the container may be held suspended above an open flame. Since the heat from the flame usually radiates onto or contacts only one side of the supply of kernels, it was necessary to vigorously shake the container so that all the kernels would be heated and to prevent burning of the popped corn. Another method was to place a supply of kernels in a covered pan disposed on a burner of a kitchen range, for example, and again shake the pan to properly heat all the kernels and to agitate the popped corn. Still another method has been to place the kernels in an enclosure having wall areas containing electrical heating elements. This method again usually requires that the enclosure be at least slightly agitated. In all of these methods, butter and salt must be subsequently added.

In a copending application Ser. No. 865,824, filed Dec. 30, 1977, and assigned to the same assignee as the present invention there is disclosed an appliance for heating nuts, seeds, kernels and the like by microwave energy and which comprises a substantially conical bowl which holds the kernels in its lower end and which has a large interior volume above the kernels to allow the popped kernels to rise in the bowl when heated. However, microwave energy usually is distributed through substantially the entire oven cavity and attempts are generally made to control the energy so that it is distributed substantially uniformly throughout the oven. Popping of corn in such an appliance takes a relatively long time even when the kernels are clumped in the bottom of the bowl.

SUMMARY OF THE INVENTION

The present invention overcomes the above and other disadvantages of devices of the character described by the provision of a novel appliance which utilizes microwave energy as the heat source. The appliance comprises a bowl-like container of microwave-transparent material and of selected size and shape into which seedlike items such as popcorn kernels may be placed. Upon subjection of the device to microwave energy, as in a microwave oven, the kernels will become heated and will expand or explode, in the case of popcorn kernels.

The bowl is preferably substantially conical in shape with its small end being disposed downwardly so as to form at its lower end an internal region of restricted volume within which the kernels are disposed and retained in a relatively compact clump. The region of the bowl above the area of restricted volume is larger so that when the kernels are expanded or exploded, as in the making of popcorn, the exploded items will be forced upwardly in the bowl, while unexploded kernels will remain in the bottom thereof.

The bowl may be provided with shapes other than conical, if desired, as long as the unpopped kernels remain constantly together in a clump at the bottom of the bowl and the popped items are allowed to be violently propelled upwardly when heated into an area of larger volume.

In accordance with this invention there is provided means associated with the appliance for concentrating microwave energy in the area of the bowl which contains the unpopped kernels. This is achieved by inserting the lower end of the bowl within a cavity in a block of microwave-transparent material whereupon the block forms a microwave energy concentrator.

The cavity in the block forms surfaces between which the microwaves are reflected so that they eventually, if not initially, will be concentrated upon and adsorbed by the kernels in the clump.

The concentrator may take other forms. For example, the bottom of the cone may be a convex piece of thin metal. Alternatively, it may be a flat metal disc disposed above an aperture in a metal base plate spaced about one quarter wavelength from the disc; or it may be a loaded portion of the bowl itself, that is, the portion of the bowl surrounding the clump may be of plastic or glass containing selected amounts of metal or carbon particles. Metal and carbon particles are particularly good for concentration of microwaves because they readily influence the directions or paths of the microwaves.

BRIEF DESCRIPTION OF THE DRAWINGS

The above and other advantages of this invention will become apparent from the following description taken in connection with the accompanying drawings, wherein:

FIG. 3 is an elevational view of a second bowl configuration with support block for concentrating microwaves; and FIGS. 4 and 5 are vertical sectional views through popcorn makers with other forms of microwave concentrators.

DESCRIPTION OF THE PREFERRED EMBODIMENTS

Figure 1:
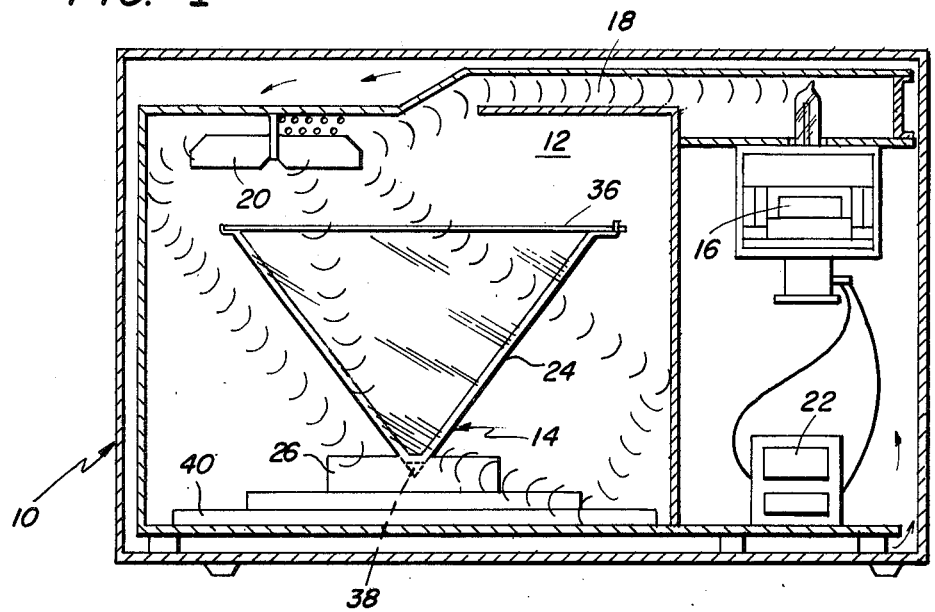
FIG. 1 is a vertical sectional view of a microwave oven showing a popcorn maker embodying the invention located within the oven cavity.

Referring more particularly to the drawings wherein like characters of reference designate like parts throughout the several views, there is shown in FIG. 1 a microwave oven 10 including an oven cavity 12 having a popcorn maker 14 which may be positioned therein through a door (not shown). The oven cavity is supplied with microwave energy from a magnetron 16 via a waveguide 18. While the magnetron 16 may generate energy of any desired frequency, a frequency of about 2.45 KMH is particularly suitable. The oven cavity 12 has internal dimensions which are many times the free space wavelength of said frequency so that many different resonant modes may be produced therein and such modes may be cyclically distributed by a mode stirrer 20.

The cathode of magnetron 16 is supplied with filament heater power and anode voltage power at a voltage of, for example, 4000 volts from a high voltage power supply 22 by suitable wiring while the anode of the magnetron 16 is grounded.

It is believed that this provides sufficient description of the microwave oven 10 and for more information reference may be made to many existing patents or to copending application Ser. No. 671,469, filed by McConnell et al and assigned to Amana Refrigeration, Inc.

It is to be understood that the present invention is concerned with appliances which may be used for the heating of various types of seeds, nuts, grains or the like by microwave energy. However, the invention is primarily concerned with popcorn makers of novel design and construction which produce relatively large fluffy popcorn by the heating of kernels with microwave energy such as may be supplied by a conventional household microwave oven or other source of microwave energy.

Figure 2:
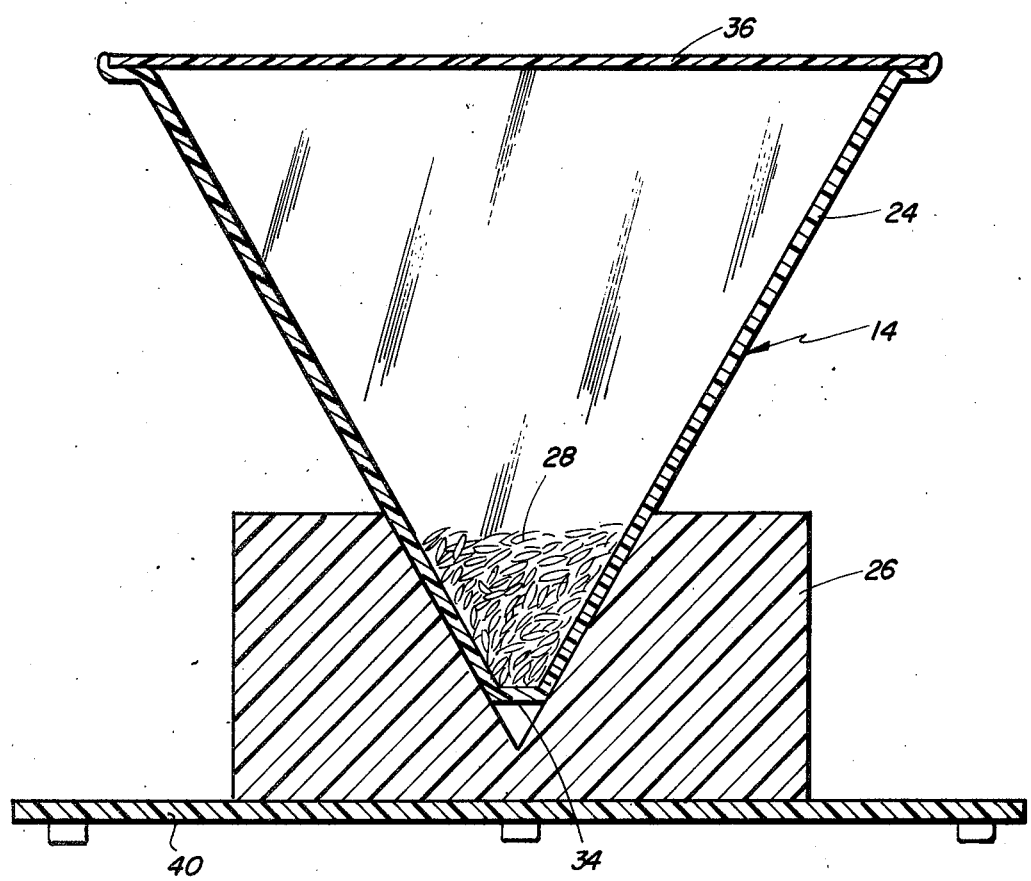
FIG. 2 is a vertical sectional view through a preferred bowl and support therefor.

Referring more particularly to FIG. 2, the basic popcorn maker includes a bowl or container 24 which is of a selected shape having a lower region of small internal volume and an upper region of larger internal volume. Such a shape is particularly well exemplified in the conical configuration shown in FIG. 2 wherein the apex of the cone is located at the bottom and the larger end is at the top. Such a conical bowl 24 may be supported by a block 26 of suitable material having a conical depression in its upper surface in which the small end of the bowl 24 is positioned.

In a bowl 24 of the desired shape, the unpopped kernels 28 will necessarily form a closely compacted clump in the bottom of the bowl. When the microwave oven is operated in the normal manner, the microwave energy will enter the oven cavity 12 and will be directed throughout the cavity by multiple reflections off the walls of the oven. Such energy will pass through the walls of the bowl 24 and the microwave transparent support block 26 and will cause heating of the kernels, causing them to explode as is well known in the art of making popcorn.

The bowl 24 and supporting block 26 will be made of a material which is transparent to the microwave radiation. Glass is particularly well suited for the invention as are several plastic materials such as styrene, polycarbonate, and polymethylmethacrylate, for example. Ceramic materials may also be used if desired. It is important, however, that the bowl and block have a low dielectric loss at microwave frequencies, thus making it readily transparent to microwaves. However, in accordance with this invention those elements, particularly the support block 26, may be provided with a slight controlled amount of lossiness if desired, and this may be done by including small amounts of metal or carbon particles. Such lossiness should not, however, interfere with the efficient transmission of microwaves through the material. It is particularly desired that the bowl remain cool enough to handle after subjection to microwave energy.

The bowl 24 will preferably be conical in shape as shown in FIG. 2 with its side walls being angled at approximately 70°. However, the bowl may be shaped other than conical such as by being provided with a relatively small concave lower end portion which merges into side walls which extend upwardly and outwardly to form an upper portion of larger volume than the small end portion. The support block will be provided with a recess in its upper surface which preferably conforms to the shape of the lower end portion of the bowl. In the bowl 24 the extreme lower end is slightly flattened, as shown at 34 in FIG. 2.

A lid 36 is located on the open top of the bowl to prevent undesired escape of popcorn during a popping process. However, it is desirable that steam which is created by the heating of the kernels be allowed to escape. Therefore, the lid 36 is provided with perforations which may be arranged in any desired pattern.

All parts of the device including the lid 36 and support block 26 are made of microwave-transparent material as is the bowl 24 so that microwaves may easily find their way to the clump of kernels 28.

It has been found that microwaves entering the cavity 12 progress directly or by reflection to the clump 28 and cause the kernels in the clump to be heated without causing any substantial heating of the parts of the device. Such heating of the kernels or grains will cause them to expand, puff or, in the case of popcorn, to explode. Such explosion will cause the exploding kernels to move violently upward in the bowl 24. It is believed that kernels near or on the small flat bottom 34 or lying against the inclined walls of the cone may explode before other kernels within the clump. However, in any case, the explosion and resultant violent movement of a kernel will cause a disruption of the kernels within the clump. The popped kernel will fly upwardly, causing some unpopped kernels to also be moved up in the bowl. However, such unpopped kernels will fall back down into the clump because of the steep inclination of the walls and because of their relatively small size. Popped kernels will, because of their relative size, stay above the clump.

It has been found that the walls of the cavity or recess 38 will reflect a substantial amount of impinging microwaves. Such reflections of microwaves is well known. However, in this invention it has been found possible to use this well known phenomenon to create additional passage of microwave energy through the area of the bowl which contains the clump 28 of kernels. Such resultant concentration of microwaves upon the clump 28 causes the kernels to be heated and popped much quicker than they would otherwise.

In further accordance with this invention the lower end or apex of the conical bowl is slightly flattened as described above. This provides an additional surface for the production of multiple reflections of microwaves.

Still further according to this invention the support block 26 may contain small amounts of metal, carbon or ferrite particles or other materials which are known to provide a plastic or glass item with "lossiness," a term indicating that the block will have some tendency to absorb at least a small amount of microwave energy and to convert that energy to heat.

The dielectric constant of the block material will be somewhat less than 10 and greater than 1, and would be a function of the size and the mass of the part.

In such a case the heat in the block 26 will be radiated onto or conducted to the kernels to assist in the popping process and thus shorten the popping time cycle.

The block 26 will preferably be mounted on a base 40 which is also transparent to microwave energy.

In FIG. 3 there is shown a corn popper with a different form of microwave concentrator. In this embodiment the conical bowl 42 has a frusto-conical shape since its apex is foreshortened. At its lower end the bowl is provided with a concave metal end disc 44 which is sealed at its periphery to the adjacent end of the bowl. The diameter of the disc 44 and the radius of the concavity in the disc are coordinated with the angle of inclination of the sides of the bowl for correct match and concentration of power at the particular microwave frequency being used. The kernels will rest on the metal disc 44 and upon the adjacent sides of the bowl so as to be affected by both the direct impingement of the microwaves plus the heat generated in the disc 44 by the microwaves. The bowl 42 may be located in a cavity or recess in a support block such as block 26, or may be supported in any other manner such as on a base 46 which forms the bottom of a suitable microwave-transparent support frame 46.

In a further embodiment of the invention, as shown in FIG. 4 the conical microwave transparent bowl 50 has its apex or lower end terminating in a flat disc 52 of metal. The disc 52 is supported above a metal plate 54 which is much larger in diameter than disc 52. Plate 54 has a hole 56 in its center, the diameter of hole 54 being matched to the outside diameter of the overlying disc 52. The spacing between disc 52 and plate 54 are also matched.

The plate 54 and bowl 50 may be mounted in any convenient way. However, the plate 54 may comprise the base of a microwave-transparent frame 58 which supports the bowl 50 at its upper end, for example.

The kernels are placed within the bowl upon the metal disc 52. When microwave energy is applied the power is concentrated by the metal members into the clump of kernels. Also the heat generated in disc 52 will further contribute to the popping process, creating a high degree of efficiency that will exceed corn popping by conventional methods.

A particularly simple and novel popcorn maker is shown in FIG. 5 and consists of only two parts, a stemmed bowl 60 and a cover 62, both made primarily of microwave-transparent material. The bowl 60 will be of selected size to hold a desired amount of popcorn, for example one to six quarts. The sides of the bowl will taper at the correct angle, such as 70°, for example, to provide the substantially conical shape. At the base of the bowl there is a section 64 which is "loaded," that is, made "lossy" by the inclusion of metal, carbon or ferrite powders or particles.

Such a bowl, including both the loaded and unloaded areas, could be molded in one piece or in two separate pieces subsequently bonded together. The loading could be an integral part of the glass or plastic composition before molding.

The bowl 60 may be supported in an upright position by an integral stem and base 66. When kernels are placed in the bottom of the bowl 60, microwave energy will pass directly to the kernels and to the lossy portion 64 of the bowl. The kernels will absorb a substantial amount of the directly impinging energy, and will be heated as well by heat generated in the lossy portion 64.

In all of the embodiments shown and described there has been provided a novel appliance for popping corn by microwave energy wherein means is also provided for concentrating microwave energy within a relatively small area occupied by kernels being popped.

From the foregoing it will be apparent that all of the objectives of this invention have been achieved in the microwave appliance shown and described. All parts of the device are made of material having low dielectric loss at microwave frequencies and are, therefore, microwave transparent and include substantially no metal or carbons which would become heated when subjected to microwave radiation except in selected areas where required to provide concentration of microwave energy, as described. The presently described appliance is, as pointed out, adaptable to various modifications and embodiments which may have different dimensional or thermal variations.

However, it is to be understood that various modifications and changes in the structures shown and described may be made by those skilled in the art without departing from the spirit of the invention as expressed in the accompanying claims. Therefore, all matter shown and described is to be interpreted as illustrative and not in a limiting sense.

What is claimed is:

1. Apparatus for heating kernels, seeds, nuts, grains and like items comprising a microwave cavity means for directing microwave energy into said cavity, an appliance adapted to be removably positioned in said cavity within the field of radiation from said means and comprising a bowl having a lower region of restricted internal volume for holding a clump of said items and an upper region of a volume greater than the volume of said lower region, said bowl being transparent to microwaves, and means for concentrating said microwave energy upon said lower region and clump therein.

2. Apparatus as set forth in claim 1 wherein said bowl is substantially conical in shape and has a closed lower end.

3. Apparatus as set forth in claim 1 wherein said lower region of the bowl has an external shape of predetermined configuration, and said concentrating means comprises a support for the bowl located beneath said lower region and having a cavity in its upper side shaped to receive said lower region, said support being transparent to microwaves and said means including microwave-reflecting surfaces on the cavity directed toward said clump.

4. Apparatus as set forth in claim 3 wherein said bowl is substantially conical with the apex thereof comprising said lower region, and the cavity in said support is conical in shape to interfit with said lower region.

5. Apparatus as set forth in claim 4 wherein said apex of the conical bowl is flattened, and a space is provided between said flattened end and the bottom of the cavity in the support for providing at least one additional microwave-reflecting surface.

6. Apparatus as set forth in claim 5 wherein said support is made of microwave-transparent material containing selected amounts of particles of material not transparent to microwaves.

7. Apparatus for heating kernals, seeds, nuts, grain and like items by microwave energy a microwave cavity, means for directing microwave energy into said cavity, a substantially conical container formed of material transparent to microwave energy, said container having means at one end for retaining said items in a clump and having a region above the clump which is larger in internal volume than the volume occupied by the clump, and means for concentrating microwave energy upon said first means and clump therein.

8. Apparatus as set forth in claim 7 wherein said concentrating means comprises a support of microwave-transparent material located beneath said container and having a portion enclosing said means for retaining the items in a clump.

9. Apparatus as set forth in claim 8 wherein said means for retaining the items in a clump comprises the lower portion of the substantially conical container, and said support has a recess in its upper side which receives and encloses said lower portion of the container.

10. A microwave corn popper apparatus comprising a microwave cavity, means for directing microwave energy into said cavity, a bowl of microwave-transparent material, said bowl having a lower region of restricted internal volume for holding kernels to be popped, and further having an upper region of larger internal volume located above said lower region, and a support beneath said bowl, said support being transparent to microwaves and having support means interfitting with said lower region of the bowl for supporting the bowl in an upright position, said support means including means for concentrating microwave energy upon said lower region and kernels therein.

11. A microwave corn popper as set forth in claim 10 wherein said bowl is substantially conical in shape.

12. A microwave corn popper as set forth in claim 11 wherein said support means has a conical recess in its upper side which interfits with the lower end of the conical bowl, said recess having microwave-reflecting surfaces directed toward said kernels and comprising said concentrating means.

13. A microwave corn popper as set forth in claim 11 wherein the apex of the conical bowl is flattened and a space is provided between said flattened apex and the bottom of the recess in the support for providing at least one additional microwave-reflecting surface.

14. Apparatus as set forth in claim 1 wherein said concentrating means comprises a metal disc disposed at the lower end of the bowl, the disc being secured at its periphery to the walls of the bowl and having a convex shape.

15. Apparatus as set forth in claim 1 wherein said concentrating means comprises a metal disc disposed at the lower end of the bowl and secured at its periphery to the walls of the bowl, and a metal plate beneath and spaced from said disc, the plate being larger in diameter than the disc and, having an opening directly beneath the disc of a diameter substantially the same as the disc.

16. Apparatus as set forth in claim 1 wherein said concentrating means is incorporated within said lower region of the bowl and comprises selected amounts of microwave-absorbing materials within the microwave-transparent material from which said lower region is formed.

17. A method of making popcorn comprising disposing a supply of unpopped popcorn kernels in a container which has restraining means for retaining said kernels in a clump and has inclined walls with one end associated with said restraining means, subjecting said clump to microwave energy and concentrating said energy upon said clump for a period of time to cause some of said kernels to abruptly explode and consequently remove themselves from the restraining means and simultaneously causing some of the unexploded kernels to move out of the restraining means onto an inclined wall and thence back into said restraining means, and continuing the application and concentration of microwave energy until at least a major portion of the kernels have exploded and removed themselves from the restraining means.

18. A method of making popcorn comprising the steps of retaining a supply of unpopped popcorn kernels in a clump, subjecting said clump to microwave energy and concentrating said energy upon said clump for a period of time sufficient to cause some of said kernels to explode with consequent removal from the clump and simultaneous disturbance of unexploded kernels in the clump, and continuing and application and concentration of the microwave energy to the clump while the disturbed unexploded kernels move back into said clump and until at least a major portion of the kernels have exploded and removed themselves from the clump.

* * * * *